(12) United States Patent
Jurzitza et al.

(10) Patent No.: US 7,876,812 B2
(45) Date of Patent: Jan. 25, 2011

(54) TRANSMISSION OF MULTIPLE INDEPENDENT SIGNALS OVER A COMMUNICATION LINK

(75) Inventors: Dieter Jurzitza, Karlsruhe (DE); Matthias Rupprecht, Straubenhardt (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1037 days.

(21) Appl. No.: 10/900,577

(22) Filed: Jul. 26, 2004

(65) Prior Publication Data
US 2005/0058000 A1   Mar. 17, 2005

(30) Foreign Application Priority Data
Jul. 25, 2003 (EP) ................................ 030 17 002

(51) Int. Cl.
*H04B 1/38* (2006.01)
(52) U.S. Cl. .................... 375/219; 375/220; 375/222
(58) Field of Classification Search ............... 375/219, 375/220, 222; 307/10.1; 455/420, 345
See application file for complete search history.

(56) References Cited

U.S. PATENT DOCUMENTS

| | | | | |
|---|---|---|---|---|
| 4,084,069 A | * | 4/1978 | Looschen | .................... 375/288 |
| 4,280,221 A | * | 7/1981 | Chun et al. | .................. 375/288 |
| 4,717,896 A | * | 1/1988 | Graham | ........................ 333/25 |
| 4,823,364 A | * | 4/1989 | Herzog | ......................... 375/258 |
| 5,737,309 A | | 4/1998 | Ewell et al. | |
| 5,890,214 A | | 3/1999 | Espy et al. | |
| 6,917,122 B2 | * | 7/2005 | May et al. | ..................... 307/9.1 |
| 7,123,673 B2 | * | 10/2006 | Czekaj et al. | ................ 375/350 |
| 2003/0081761 A1 | * | 5/2003 | Schley-May | ................. 379/402 |

FOREIGN PATENT DOCUMENTS

| | | |
|---|---|---|
| DE | 198 53 665 | 5/2000 |
| EP | 0 112 716 A | 4/1984 |

\* cited by examiner

*Primary Examiner*—Shuwang Liu
*Assistant Examiner*—Kabir A Timory
(74) *Attorney, Agent, or Firm*—Brinks Hofer Gilson & Lione

(57) ABSTRACT

A system for transmitting a plurality of independent data signals between two modules connected to a communication link is provided. The communication link may be a two lead wired connection. A first data signal may be transmitted in form of a differential signal over the communication link. A second data signal may be transmitted between both connected modules by adding the second data signal identically to both leads of the communication link. The second data signal references a ground potential which is common to both connected modules.

33 Claims, 3 Drawing Sheets ated signals result in an increased hardware and computa-
TRANSMISSION OF MULTIPLE INDEPENDENT SIGNALS OVER A COMMUNICATION LINK

PRIORITY CLAIM

This application claims the benefit of European Patent Application No. EP 03 017 002.1, filed Jul. 25, 2003, which is hereby incorporated by reference herein in its entirety.

BACKGROUND OF THE INVENTION

1. Technical Field

This application relates to the transmission of independent data signals over a communication link. In particular, this application relates to a method of transmitting a plurality of independent data signals from a transmitting module to a receiving module and to a transmitting and/or receiving apparatus connectable to a communication link, especially for use in communication networks provided on vehicles.

2. Related Art

Modern vehicles may include a number of information and entertainment components. Thus, vehicles may be provided with a high speed network as an infrastructure for managing the components in the vehicle that need to interact. As a standard for high speed multi media busses in vehicles, the MOST (Media Oriented Systems Transport) technology has found wide acceptance as a vehicle multi media bus. This bus allows a cost efficient communication between all functional blocks of entertainment and information systems, such as CD and DVD players, CD/DVD changers, cell phones, video systems, in-car PC's and the like. The network bus described by the MOST standard offers a speed of 24.8 Mbits/second which makes it about 100 times faster than the control-area network (MAY) busses. MAY busses are typically used in power train applications. The MOST specification defines the hardware interface needed to communicate over the bus. According to the MOST standard, either a plastic optical fiber or an electric wired connection may be employed for the physical bus.

An electric wired communication bus in a vehicle may be implemented in the form of a twisted pair connection. A twisted pair is a two lead wire usually made of copper that connects the different modules. In order to reduce cross talk or electromagnetic induction between pairs of wires, the two insulated wires are twisted around each other. Each connection of a twisted pair requires both wires. The twisted pair may either be used as a shielded twisted pair or as an unshielded twisted pair.

In a general configuration of a vehicle including a plurality of communication devices as part of an entertainment and information system, the communication devices installed on vehicle range from data generating devices, like radio or TV tuners or PCs, over data processing units (like amplifiers) and user interfaces to reproducing units such as displays and loud speakers. In the structure of the underlying communication system, a bus may be connected to the individual communication devices. The bus configuration may be a uni-directional data transmission. Alternatively, the data may be transmitted in a bi-directional manner between each or at least a sub-set of the communication devices connected to communication link.

In a general configuration of two modules or apparatus connected to an electrical MOST bus data may be transferred from a first module to a second module via communication link. The communication link may be implemented in the form of a twisted pair of cables. Data stemming from a data source of the transmitting module may be transferred on a symmetrical basis over a twisted pair of cable. In the receiving module, the data may be recovered by a data sink. In order to avoid any degradation of the data quality due to EMI (Electromagnetic Interference) the communication link may be decoupled from the data source and the data sink by providing transformers in-between. The transformers effect a complete galvanic decoupling of the internal processing within the modules from the signal on the cable. The signal is transmitted on the cable as a differential signal.

Additional data signals may be transmitted between a transmitting module and a receiving module by providing additional cables between both modules. Alternatively, independent data signals to be transmitted between both modules may be merged by modulating both signals and respectively demodulating the signals at the receiving side.

These systems for transmitting a plurality of independent data signals between interconnected modules result in additional hardware effort. A supplementary cable connection results in a duplication of the existing communication hardware. On the other hand, the use of modulation and demodulation stages results in an increased hardware and computation effort on the transmitting and receiving sides. Moreover, such additional processing steps generally do not allow maintenance of existing communication systems that are also affected by the additional processing stages.

Thus, there is a need for a method for transmitting a plurality of independent signals between modules connected to a communication link and corresponding apparatuses connectable to the communication link, where the transfer of an additional data signal may be achieved with less hardware/computational efforts.

SUMMARY

This application provides a method for transmitting a plurality of independent data signals between two modules connected to a communication link. The communication link may be a two lead wired connection. A first data signal may be transmitted in the form of a differential signal over the communication link. A second data signal may be transmitted between both connected modules by adding the second data signal identically to both leads of the communication link. The second data signal may reference a ground potential that is common to both connected modules. Thus, a first electric data signal may be transmitted over a symmetric channel that is potential free with respect to its environment. By appropriately superimposing an additional data signal, both data channels do not interfere with each other.

A transmitting and/or receiving apparatus is also provided. The transmitting and/or receiving apparatus may be connectable to a communication link for linking a plurality of transmitting and/or receiving apparatus. The communication link may be a two lead wired connection. The transmitting and/or receiving apparatus may comprise a first data generating or receiving unit, a converting unit, and a second data generating or receiving unit. The first data generating or receiving unit generates or may receive a first data signal. The converting unit may be connected to the first data generating or receiving unit and connectable to the communication link. The converting unit either coverts the first data signal into a differential signal or obtains the first data signal form the communication link.

The second data generating or receiving unit may generate or receive a second data signal and is connectable to the communication link. The second data generating or receiving unit may add or obtain the second data signal superimposed in identical form on both leads of the communication link. The transmitting and/or receiving apparatus may further be connectable to a ground potential which is common to the transmitting and/or receiving apparatus connected to the communication link. The second data signal may reference the common ground potential.

A vehicle entertainment and information system is also provided. The vehicle entertainment and information system may comprise a plurality of transmitting and/or receiving apparatus that may be connected to a communication link. The transmitting and/or receiving apparatus may be configured as set forth above. In one example, a first data signal may be transmitted and received on/from the communication link where the connected modules are electrically decoupled from the communication link. The decoupling may reduce sensitivity to noise and in a particular to EMI. The connected modules may be decoupled by means of respectively provided transformers.

The second data signal to be superimposed on the first data signal may be a serial digital signal. For example, a transmitting module may comprise an encoder for encoding the second data signal before transmission and a receiving device preferably comprises a corresponding decoder. The provision of an encoder and decoder may enable the transmission of any kind of data over the communication link. The second data signal may be electrically decoupled from the communication link before being added to the first data signal.

In one example, the first data signal may be transmitted between two modules in a uni-directional manner. The transmitting unit may be a data generating device like a DVD player, a navigation data database, an on-board PC, etc. while the receiving device may, for instance, be a display unit. By providing an additional data channel able to transmit data in a direction vice versa to the transmitting direction of the first data signal, the receiving device may transmit internally obtained data, for instance, status information or error message data, back towards the transmitting device. Thus, each module may be able to communicate with the other modules connected to the communication link in a simple manner. Further, the receiving device may be a man-machine interface. User operation information, for instance selection information or a change of the operating conditions, may thus be forwarded back to the transmitting module.

The second data signal may be transmitted in a bidirectional manner between two modules. In addition to the transmission of the first data, for instance video or audio data, additional control information may be exchanged between the modules without any amendments to the existing communication structure. A receiving module may separate the first and second data signals from the communication link by adding and subtracting the electrical signals of both leads of the communication link. The data transmitted on the single physical connection may be easily separated for their individual further processing.

In one example, the modules may be installed on a vehicle. The communication link may be a vehicle entertainment and information bus, which may be configured in accordance with the standardized MOST bus. Thus, an enhanced operability of a standardized bus configuration is provided in a simple manner. By connecting each module to a vehicle part providing ground potential, a module installed anywhere in the vehicle may be connected in a simple manner to ground potential. The second signal may thus be obtained anywhere within the vehicle without additional cabling. Further, these modules may be connected to the vehicle chassis providing vehicle ground potential.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

This application relates to the transmission of independent data signals over a communication link. In particular, this application relates to a method of transmitting a plurality of independent data signals from a transmitting module to a receiving module and to a transmitting and/or receiving apparatus connectable to a communication link, especially for use in communication networks provided on vehicles.

Figure 1:
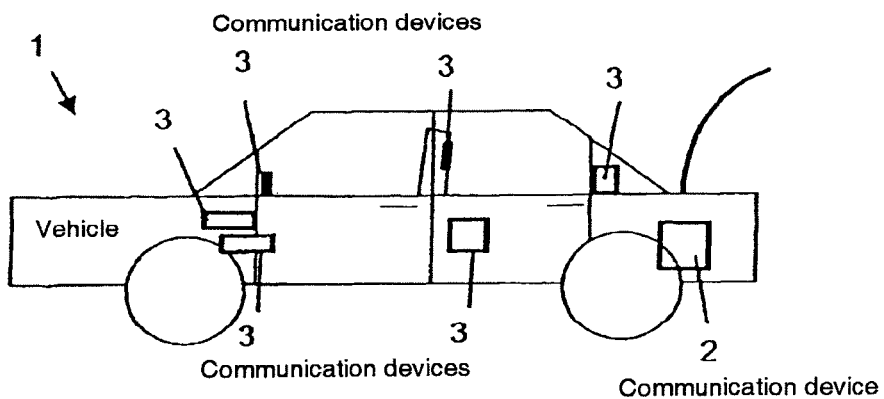
FIG. 1 is a schematic illustration of a vehicle equipped with a plurality of modules of a vehicle information and entertainment system.
Figure 2:
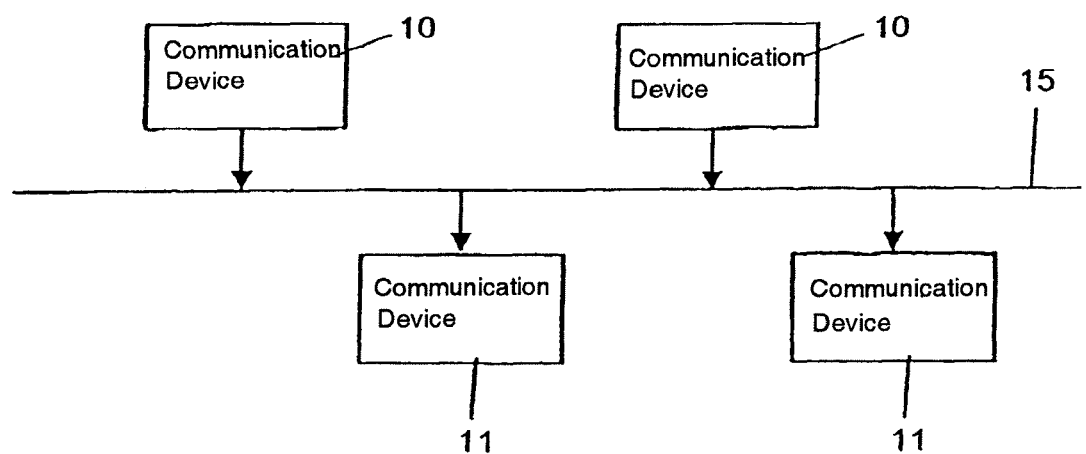
FIG. 2 is a schematic illustration, in block diagram form, of a configuration of a communication system linking a plurality of individual modules connected thereto.

A general configuration of a vehicle 1 including a plurality of communication devices 2, 3 as part of an entertainment and information system is illustrated in FIG. 1. The communication devices installed on vehicle 1 range from data generating devices, like radio or TV tuners or PCs, over data processing units (like amplifiers) and user interfaces to reproducing units such as displays and loud speakers. The structure of the underlying communication system is depicted in FIG. 2. FIG. 2 shows a bus 15 connected to the individual communication devices 10, 11. A person skilled in the art will appreciate that the bus configuration is not limited to a uni-directional data transmission as illustrated in FIG. 2. Alternatively, the data may be transmitted in a bi-directional manner between each or at least a sub-set of the communication devices 10, 11 connected to communication link 15.

Figure 3:
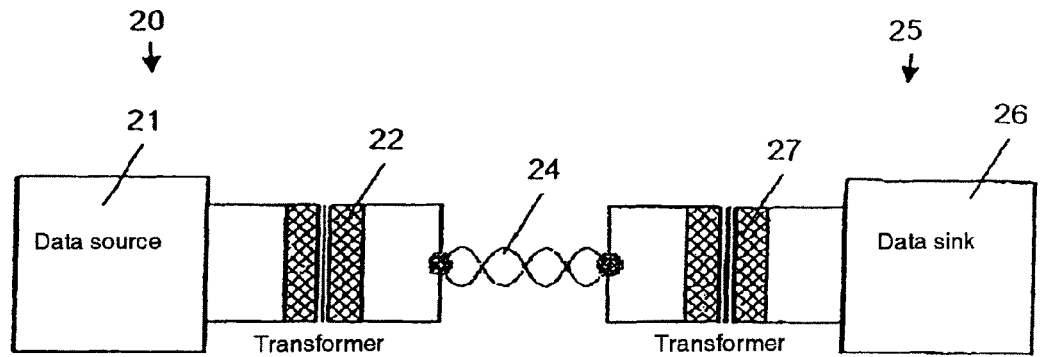
FIG. 3 is a schematic illustration of a configuration of a transmitting and receiving module connected to the communication link.

A general configuration of two modules or apparatus connected to an electrical MOST bus is illustrated in FIG. 3. In FIG. 3, data may be transferred from a first module 20 to a second module 25 via communication link 24. The communication link 24 may be implemented in form of a twisted pair of cables. Data stemming from a data source 21 of the transmitting module 20 may be transferred on a symmetrical basis over the twisted pair of cable 24. In the receiving module 25, the data may be recovered by data sink 26. In order to avoid any degradation of the data quality due to EMI (Electromagnetic Interference) the communication link 24 may be decoupled from data source 21 and data sink 26 by providing transformers 22, 27 in-between. The transformers may effect a complete galvanic decoupling of the internal processing within the modules 20 and 25 from the signal on the cable. The signal may be transmitted on the cable as a differential signal. Additional data signals may be transmitted between a transmitting module and a receiving module by providing additional cables between both modules. Alternatively, independent data signals to be transmitted between both modules may be merged by modulating both signals and respectively demodulating the signals at the receiving side.

These systems for transmitting a plurality of independent data signals between interconnected modules may result in additional hardware effort. A supplementary cable connection results in a duplication of the existing communication hardware. On the other hand, the use of modulation and demodulation stages result in an increased hardware and computation effort on the transmitting and receiving sides. Moreover, such additional processing steps generally do not allow for maintenance of existing communication systems that are also affected by the additional processing stages.

This application provides a method for transmitting a plurality of independent signals between modules connected to a communication link and corresponding apparatuses connectable to the communication link, where the transfer of an additional data signal may be achieved with less hardware/computational efforts.

Figure 4:
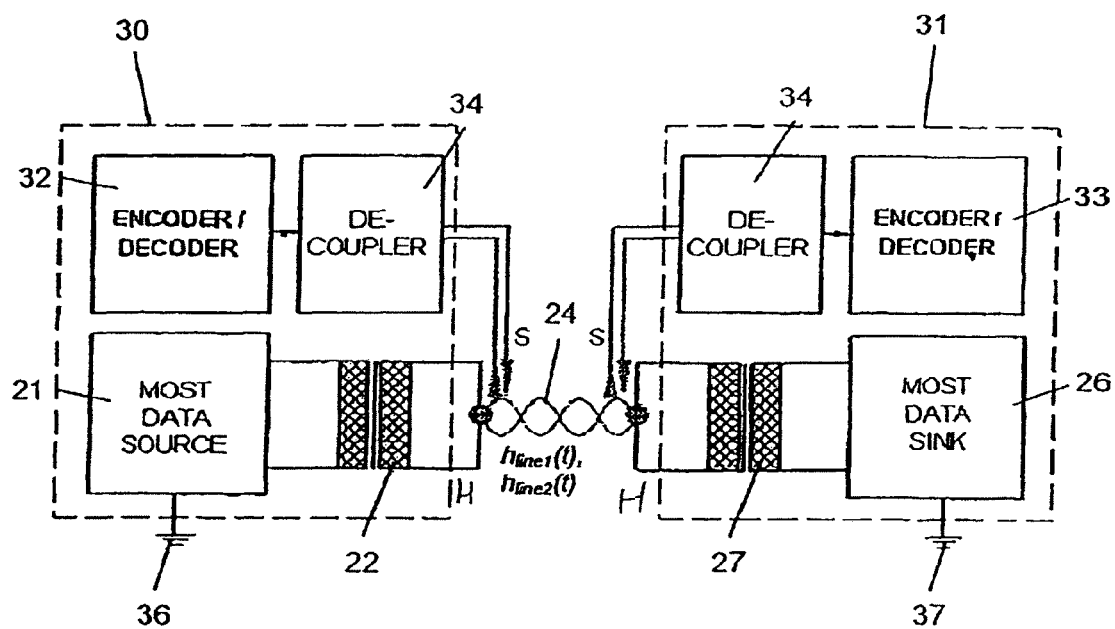
FIG. 4 illustrates, in block diagram form, a transmitting and receiving module able to transmit additional information over the single physical connection.

A configuration of a transmitting and receiving module is depicted in block diagrammatical form is shown in FIG. 4. The modules 30 and 31 comprise the same elements as already described in connection with the configuration of FIG. 3. The transmitting module 30 comprises a data source 21 connected to transformer 22 for decoupling data source 21 from the communication link 24. Transformer 22 may convert the first data signal H into a differential signal to be transmitted over the communication link 24. In one example, the communication link 24 may be a twisted pair of cabling comprising two lead wires.

The receiving module 31 may be connected to the communication link 24 by transformer 27, which may decouple the received data signal from the communication link 24. The first data signal may thus be transmitted on communication link 24 in a symmetrical manner. Both transformers 22, 27 may reduce the susceptibility of the communication link to distortions, in particular to avoid electromagnetic interference. This is achieved by a complete galvanic decoupling of the transmitted signal on the cable. The configuration employed for transmitting a first data signal H does not make reference to any electric potential in the system surrounding the communication system. The individual modules 30, 31 may further be connected to an electric potential provided by the environmental system. In one example, the modules 30, 31 are mounted in a vehicle. The modules 30, 31 may be connected to the common electric potential by coupling same, for instance, to the vehicle's chassis. This is indicated by ground connections 36, 37 in FIG. 4.

The transmission of the second data signal S makes use of the common ground potential. The second data signal S may be superimposed on the first data signal H on the communication link. For this purpose, the second data signal S may be added to the differential signal H, i.e. to that signal present between the external windings of both transformers 22, 27. In order to avoid any deterioration of the first data signal H, the second data signal S may be added identically on each lead of communication link 24. As transformer 27 of the receiving module 31 may only transfers differential signal components, the added second data signal S may remain "invisible" for the subsequent processing components of the first data signal.

As the transformers 22, 27 may only transfer voltage differences across their windings, the second data signal S, which may be superimposed in identical form on both leads of the twisted pair connection 24, may not be applied to subsequent processing components of the first data signal H. In order to obtain the second data signal S, the data signals on both leads of the twisted pair connection 24 may be further applied to another processing means in receiving device 31.

In the following processing operations, the electrical signals on the individual leads of the communication link 24 are denoted as $h_{line1}(t)$ and $h_{line2}(t)$. While the first data signal may be obtained by calculating the difference between both electrical signals $h_{line1}$ and $h_{line2}$, the second data signal may be obtained by adding the electrical signals $h_{line1}$ and $h_{line2}$ These processing operations are reflected by the following equations:

$$H=0.5(h_{line1}-h_{line2}) \quad (1)$$

$$S=0.5(h_{line1}+h_{line2}) \quad (2)$$

In one example, the second data signal S may be a serial digital signal. The second data signal S may be provided by an encoder 32 of the transmitting module 30 and, after having been received and extracted by the receiving module 31, subjected to a subsequent post-processing operation in decoder 33. Further, the encoder and decoder 32, 33 may be connected to the communication link 24 via a decoupler 34.

While the second data signal and the first data signal have until now only described in form of a uni-directional data transmission, a skilled person will appreciate that a bi-directional data transmission may be implemented in a corresponding manner for the first data signal and the second data signal.

FIG. 4 illustrates combining a unidirectional data transmission of the first data signal H between data source 20 and data sink 21 and a bi-directional data transmission for the second data signal S. Thus, a high speed data transmission on data bus 24 provided in a uni-directional manner may be accompanied by an additional bi-directional transmission of a second data signal S. The second data signal S may serve for transmitting operating instructions or fundamental status information from a user interface, a display device, and the like. In addition, the transmitting device may transmit operation information and status information to the receiving device. For instance, brightness or color settings of a display may be adapted based on the second signal S, while the video data to be displayed are transmitted in form of the first data signal H. Thus, the data rate of the communicating link provided for the first data signal may be completely used for the video data while additional operation information is transmitted superimposed thereon without affecting the video data transmission.

In one example, the communication system may be constructed in a accordance with the MOST standardization of a high speed automotive data bus. Specifically, the communication system may implement the E MOST (Electrical MOST) structure. While the most data source 20 and the most data sink 21 are able to operate without any amendment in accordance with the MOST standard, additional information may be transmitted on the same physical communication link based on the present invention. Thus, costly hardware and software components may be avoided and existing equipment does not need to be replaced.

Figure 5:
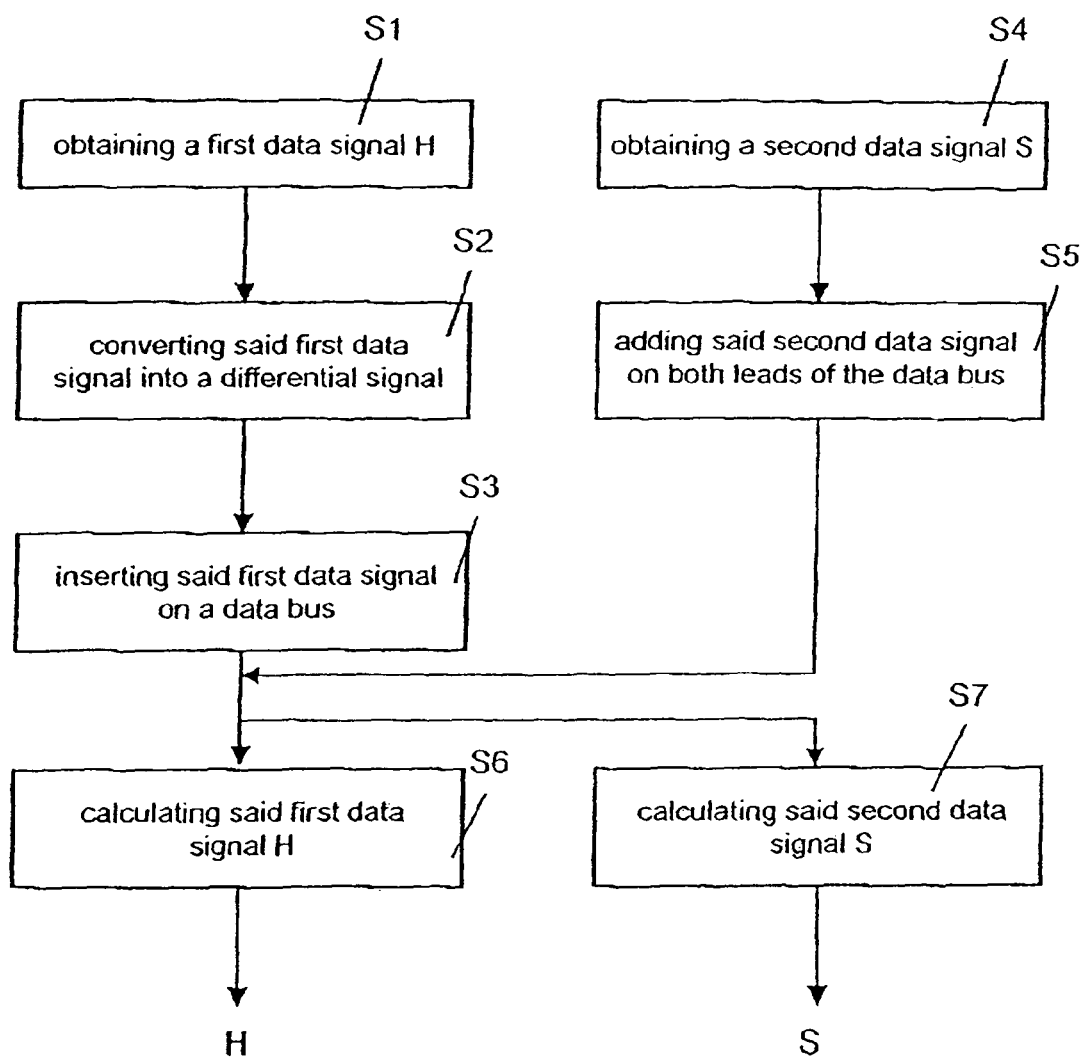
FIG. 5 is a flow chart illustrating the method of transmitting at least two independent signals over a single physical communication link.

In FIG. 5, the operation of the communication system shown in FIG. 4 is described with reference to the depicted flowchart. After obtaining the first data signal H and the second data signal S (steps S1, S4), the first data signal H may be converted into a differential signal and transmitted over communication link 24 (steps S2, S3). The second data signal S, which may be a serial digital signal, may be added identically on each lead of the communication link 24 (step S5). Both signals may be received at the receiving device 31 connected to the communication link 24. Based thereon, the first data signal H may be recovered by calculating the difference between the electrical signals of both leads of the communication link 24 (step S6). The second data signal S may be recovered by calculating the sum of both electrical signals of the two leads of communication link 24 (step S7). The calculating operation of steps S6 and S7 may be performed in accordance with equations (1) and (2), above. The obtained first and second data signals H, S may subsequently be applied to further post-processing components. Thus, the addition of an independent, parallel data transmission channel over the existing electrical data bus, in particular the MOST bus, is provided in a simple manner.

While the present application refers to a transmitting apparatus and a receiving apparatus of a communication system, this application is not limited to such a configuration. As a skilled person will appreciate, the invention can be implemented by any number of apparatus connected to a communication bus. Further, the invention is not limited to separate transmitting and receiving apparatus. Each apparatus may at the same time be adapted to transmit and receive data signals over/from the communication bus.

While various aspects of the invention have been described, it will be apparent to those of ordinary skill in the art that many more aspects and implementations are possible within the scope of the invention. Accordingly, the invention is not to be restricted except in light of the attached claims and their equivalents.

What is claimed is:

1. A method for communicating independent data signals (H, S) between at least two modules connected to a communication link, where the communication link comprises a wired connection having a first lead carrying an electrical signal $h_{line1}$ and a second lead carrying an electrical signal $h_{line2}$, the method comprising:

transmitting a first data signal (H) to a connected module in the form of a differential signal over the first lead and the second lead of the communication link, where the electrical signals which are transmitted over the first lead and the second lead of the wired connection for the first data signal (H) are of substantially equal magnitude and have opposite polarity with respect to one another and are referenced about a ground potential that is common to the at least two modules;

transmitting a second data signal (S) to a connected module in the form of a non-differential signal in which substantially identical signals are concurrently provided to the first and second leads of the communication link, where the electrical signals which are transmitted over the first lead and the second lead of the wired connection for the second data signal (S) are of substantially equal magnitude and have the same polarity with respect to one another, and are referenced to the ground potential; and recovering the second data signal (S) at a connected module by adding the electrical signals $h_{line1}$ and $h_{line2}$ of the first lead and the second lead of the communication link to one another.

2. The method of claim 1, where the connected modules are decoupled by a transformer.

3. The method of claim 1, where the second data signal (S) is a serial digital signal.

4. The method of claim 3, where the second data signal (S) is encoded before being added to the differential signal on the communication link.

5. The method of claim 3, where the second data signal (S) is decoded after being received by a receiving module.

6. The method of claim 1, where the second data signal (S) is decoupled from the communication link.

7. The method of claim 1, where the first data signal (H) is transmitted in a predetermined direction from a transmitting module to a receiving module.

8. The method of claim 1, where the second data signal (S) is transmitted in a bi-directional manner between the at least two modules.

9. The method of claim 1, where the first data signal (H) is recovered at a receiving module by subtracting electrical signal $h_{line}$ and electrical signal $h_{line2}$ from one another.

10. The method of claim 9, where the first data signal H is determined at the receiving module from the individual electrical signals $h_{line1}$ and $h_{line2}$ on the first and second leads in accordance with the following equation:

$$H=0.5(h_{line1}-h_{line2}).$$

11. The method of claim 1, where the second data signal S is determined at the receiving module from the electrical signals $h_{line1}$ and $h_{line2}$ on the first and second leads in accordance with the following equation:

$$S=0.5(h_{line1}+h_{line2}).$$

12. The method of claim 1, where the communication link is a twisted pair cable.

13. The method of claim 1, where the at least two modules connected to the communication link are installed on a vehicle.

14. The method of claim 13, where the communication link is a vehicle entertainment and information bus.

15. The method of claim 14, where the communication link comprises a Media Oriented Systems Transport bus configuration.

16. The method of claim 13, where the at least two modules are connected to a vehicle part providing the ground potential.

17. The method of claim 16, where the at least two modules are connected to a vehicle chassis as ground potential.

18. A receiving apparatus connectable to a communication link, where the communication link comprises a wired connection having a first lead carrying an electrical signal $h_{line1}$ and a second lead carrying an electrical signal $h_{line2}$ the receiving apparatus comprising:

a first data unit for recovering a first data signal (H) transmitted in the form of a differential signal carried on the electrical signals $h_{line1}$, $h_{line2}$, of the first and second leads, a second data unit for recovering a second data signal (S) carried on the electrical signals $h_{line1}$, $h_{line2}$, of the first and second leads, where the second data signal (S) is a non-differential signal that is superimposed identically on the electrical signal $h_{line1}$ carried by the first lead and on the signal $h_{line2}$ carried by the second lead of the communication link, where the second data unit is connectable to a ground potential common to the first data unit, and the second data signal (S) on the electrical signals $h_{line1}$, $h_{line2}$, of the first and second leads references the common ground potential, and where the second data unit recovers the second data signal (S) by adding the electrical signals $h_{line1}$, $h_{line2}$ carried on the first lead and the second lead, respectively, to one another.

19. The receiving apparatus of claim 18, where a converting unit electrically decouples the first data unit and the communication link.

20. The receiving apparatus of claim 18, where the second data signal (S) is a serial digital signal.

21. The receiving apparatus of claim 20, where the second data unit comprises a decoder for decoding the second data signal (S).

22. The receiving apparatus of claim 18, comprising a decoupling unit for decoupling the second data signal (S) from the communication link.

23. The receiving apparatus of claim 18, where the first data unit of the receiving apparatus recovers the first data signal (H) by determining a difference between the signal $h_{line1}$ of the first lead and the signal $h_{line2}$ of the second lead.

24. The receiving apparatus of claim 18, where the second data signal S is determined from the electrical signals $h_{line1}$ on the first lead and the electrical signal $h_{line2}$ on the second lead according to the following equation:

$$S=0.5(h_{line1}+h_{line2}).$$

25. The receiving apparatus of claim 18, where the communication link is a twisted pair cable.

26. The receiving apparatus of claim 18, where the receiving apparatus is installed on a vehicle.

27. The receiving apparatus of claim 26, where the communication link is a vehicle entertainment and information bus.

28. The receiving apparatus of claim 27, where the communication link comprises a Media Oriented Systems Transport bus configuration.

29. The receiving apparatus according to claim 26, where the receiving apparatus is connectable to the vehicle chassis for obtaining the common ground potential.

30. A method for transmitting a plurality of independent data signals (H, S) between at least two modules connected to a communication link, where the communication link comprises a wired connection having a first lead carrying an electrical signal and a second lead carrying an electrical signal $h_{line2}$, comprising:

transmitting a first data signal (H) to a connected module in the form of a differential signal imposed on the electrical signals $h_{line1}$, $h_{line2}$, carried on the first and second leads of the communication link, respectively; and transmitting a second data signal (S) to a connected module in the form of a non-differential signal imposed on the electrical signals $h_{line1}$, $h_{line2}$, carried on the first and second leads of the communication link, respectively, where the non-differential signal comprises substantially identical signals that are concurrently imposed on the electrical signals $h_{line1}$, $h_{line2}$, of the first and second leads of the communication link, respectively;

recovering the second data signal (S) by determining a sum of the electrical signals $h_{line1}$, $h_{line2}$, of the first and second lead of the communication link in accordance with the equation $S=0.5(h_{line1}\ h_{line2})$; and recovering the first data signal (H) by determining a difference between the electrical signals $h_{line1}$, $h_{line2}$, of the first lead and the second lead of the communication link in accordance with the equation $H=0.5(N_{line1}-h_{line2})$.

31. A receiving unit connectable to a communication link for linking a plurality of communication apparatus, where the communication link comprises a wired connection having a first lead carrying an electrical signal $h_{line1}$ and a second lead carrying an electrical signal $h_{line2}$, the receiving unit comprising:

a first data unit for recovering a first data signal (H) from a differential signal on the first and second leads of the communication link, (H) by determining a difference between electrical signals $h_{line1}$, $h_{line2}$ of the first lead and the second lead of the communication link in accordance with the difference $H=0.5(h_{line1}-h_{line2})$;

a second data unit for recovering a second data signal (S) from a non-differential signal that is superimposed identically on the electrical signals $h_{line1}$, $h_{line2}$ of the first and second leads of the communication link in accordance with the sum $S=0.5(h_{line1}+h_{line2})$, where the receiving unit is connectable to a ground potential that is common to at least one other of the plurality of communication apparatus, and where the electrical signals $h_{line1}$, $h_{line2}$ of the second data signal (S) are carried on the first and second leads, respectively, and reference the common ground.

32. A method for communicating independent data signals (H, S) between at least two modules connected to a communication link, where the communication link comprises a wired connection having a first lead and a second lead, comprising:

transmitting a first data signal (H) to a connected module in the form of a differential signal over the first lead and the second lead of the communication link, where the electrical signals which are transmitted over the first lead and the second lead of the wired connection for the first data signal (H), respectively, are of substantially equal magnitude and have opposite polarity with respect to one another, and transmitting a second data signal (S) to a connected module in the form of a non-differential data signal in which substantially identical signals are concurrently provided to the first lead and the second lead of the communication link, respectively, where the electrical signals which are transmitted over the first lead and the second lead of the wired connection for the second data signal (S), respectively, are of substantially equal magnitude and have the same polarity with respect to one another and reference a ground potential common to the connected modules.

33. An apparatus connectable to a communication link for communicating with one or more communication apparatus, where the communication link comprises a wired connection having a first lead and a second lead, the apparatus comprising:

a first data unit for generating and/or receiving a first data signal (H) that includes a first connection to a ground potential, a converting unit connected to the first data unit and connectable to the communication link for converting or obtaining the first data signal (H) into/from a differential signal on the first lead and the second lead of the communication link, where the electrical signals which are transmitted/received over the first lead and the second lead of the wired connection for the first data signal (H), respectively, are of substantially equal magnitude and have opposite polarity with respect to one another, and a second data unit for generating and/or receiving a second data signal (S) that includes a second connection to the ground potential, where the second data unit is connectable to the first and second leads of the communication link for transmitting and/or receiving the second data signal (S) as a non-differential data signal that is superimposed identically on the first and second leads of the communication link, where the electrical signals which are transmitted over the first lead and the second lead of the wired connection for the second data signal (S), respectively, are of substantially equal magnitude and have the same polarity with respect to one another and reference a common ground potential.

* * * * *